US006682779B1

(12) United States Patent
Wefringhaus et al.

(10) Patent No.: US 6,682,779 B1
(45) Date of Patent: Jan. 27, 2004

(54) COATING MEANS FOR ELASTOMERS

(75) Inventors: Rainer Wefringhaus, Hilden (DE); Richard Hemel, Monheim (DE)

(73) Assignee: Henkel Kommanditgesellschaft auf Aktien, Duesseldorf (DE)

(*) Notice: Subject to any disclaimer, the term of this patent is extended or adjusted under 35 U.S.C. 154(b) by 0 days.

(21) Appl. No.: 10/088,729

(22) PCT Filed: Sep. 15, 2000

(86) PCT No.: PCT/EP00/09010

§ 371 (c)(1),
(2), (4) Date: Jul. 19, 2002

(87) PCT Pub. No.: WO01/23482

PCT Pub. Date: Apr. 5, 2001

(30) Foreign Application Priority Data

Sep. 24, 1999 (DE) .......................... 199 45 848

(51) Int. Cl.⁷ .................. C08L 75/06; C08G 18/61; C08G 18/80; B05D 1/36; B05D 3/02
(52) U.S. Cl. ................. 427/314; 427/393.5; 427/412.1; 528/45
(58) Field of Search ............................. 427/393.5, 314, 427/412.1; 528/45

(56) References Cited

U.S. PATENT DOCUMENTS

| | | | | |
|---|---|---|---|---|
| 4,572,871 A | 2/1986 | Mabuchi et al. | .......... | 428/423.1 |
| 4,572,872 A | 2/1986 | Yamazaki et al. | ........ | 428/423.1 |
| 4,572,875 A | 2/1986 | Gutshall | .................... | 428/585 |
| 4,945,123 A | 7/1990 | Miyama et al. | ............. | 524/269 |
| 5,115,007 A * | 5/1992 | Chihara et al. | ............. | 524/267 |
| 5,221,707 A * | 6/1993 | Chihara et al. | ............. | 524/267 |
| 5,441,771 A | 8/1995 | Seltmann et al. | ............ | 427/386 |
| 5,525,427 A | 6/1996 | Griswold et al. | ........... | 428/447 |
| 5,558,741 A | 9/1996 | Balcerski et al. | ...... | 156/244.11 |
| 5,569,707 A | 10/1996 | Blum et al. | ................. | 524/591 |
| 5,702,754 A | 12/1997 | Zhong | ....................... | 427/2.12 |
| 5,798,409 A * | 8/1998 | Ho | ............................. | 524/506 |
| 6,253,505 B1 | 7/2001 | Wefringhaus et al. | ..... | 52/204.5 |

FOREIGN PATENT DOCUMENTS

| | | |
|---|---|---|
| DE | 33 35 150 | 7/1984 |
| DE | 35 03 479 | 8/1985 |
| DE | 196 08 057 | 9/1986 |
| DE | 195 20 278 | 12/1996 |
| EP | 430421 * | 6/1991 |
| EP | 0 375 923 | 4/1994 |
| EP | 0 669 352 | 8/1995 |
| EP | 0 655 488 | 7/1998 |
| JP | 05-255587 | 5/1993 |

OTHER PUBLICATIONS

Derwent Publications Ltd., Japanese Abstract for JP 05255587, AN 1993–348607.
Determination of viscosities and flow curves using standard design rotary viscometers with a standard geometry measuring system DIN 53 019 Part 1, pp. 1–4 (May 1980).
Determination of viscosities and flow curves using standard design rotary viscometers with a standard geometry measuring system DIN 53 019 Part 2, pp. 1–25 (May 1980).
Determination of density of petroleum products DIN 51 757, pp. 1–27 (Apr. 1994).
Determinatin of the non–volatile matter content; method at elevated temperature for paints and varnishes as well as plastics DIN 53 216, pp. 1–4 (Apr. 1983).
Reflectometer as a means for gloss assessment of plane surfaces of paint coatings and plastics DIN 67 530, pp. 1–5 (Jan. 1982).
Paints and varnishes; Determination of specular gloss of non–metallic paint films at 20°, 60° and 85°, ISO 2813, (1994).
Standard Test Method for Specular Gloss, ASTM 523 (1999).

* cited by examiner

*Primary Examiner*—Erma Cameron
(74) *Attorney, Agent, or Firm*—Stephen D. Harper

(57) ABSTRACT

Disclosed are aqueous polyurethane compositions which contain at least one aqueous polyurethane dispersion, at least one compound blocked with isocyanate groups, at least one means for improving sliding behaviour, at least one surface-active and flow-control agent as well as optionally conventional bonding agents, dyes and/or pigments. Said aqueous polyurethane dispersions are useful for coating elastomers for obtaining a surface that has a very low coefficient of friction. Elastomer components that are coated according to the invention are useful for sealing window channels, for moveable glass components and/or as profiled joints in vehicle manufacturing, preferably in automobile manufacturing.

24 Claims, No Drawings

COATING MEANS FOR ELASTOMERS

BACKGROUND OF THE INVENTION

1. Field of the Invention

This invention relates to a water-based coating composition for elastomers which is suitable as a friction-reducing coating on elastomeric moldings. More particularly, the invention relates to water-based polyurethane compositions which establish a low coefficient of friction after application to typical elastomeric sealing profiles.

2. Description of the Related Art

There are a number of industrial applications which require elastomers that have to meet a number of requirements. This applies in particular to the sealing of window channels for moving glass parts and glass guide rails for glass windows in vehicles, especially motor vehicles. The elastomers are expected to show high heat resistance and weathering resistance under various climatic conditions. The surface of the elastomers is expected to have a very low friction coefficient, particularly for holding and guiding moving glass windows. The surfaces of the elastomer profiles on which the moving glass slides are normally coated with a film which has improved surface slip towards glass compared with the uncoated elastomer. There are various known processes for improving the surface slip of this coating.

DE-A-3335150 describes a polyurethane coating with beads or other particles embedded in the binder, the beads or other particles being larger than the layer thickness of the binder. These so-called "spacers" may be particles of glass, aluminium, polypropylene or polyvinyl chloride. A basic disadvantage of this procedure is that the peak and trough structure of the spacer-containing paint does not provide for optimal sealing so that unwelcome noise-creating drafts are able to penetrate. Another disadvantage is that the surface of the elastomer profiles thus coated is neither smooth nor glossy to the eye, but instead looks like emery cloth.

Another process which is described in U.S. Pat. No. 4,572,872 and U.S. Pat. No. 4,572,871 comprises adding silicones or fluororesins to a friction-reducing paint. Paints such as these have the disadvantage that, under extreme weather conditions, such as heat cold, wind and rain, to which the elastomer profile is normally exposed, the added silicones and fluororesins are depleted which results in a reduction in the surface slip of the elastomer profile towards glass and is therefore unwelcome. Another disadvantage is that the silicones are oils which are known to act as release agents. By reason of their characteristic properties, such release agents are dispersed relatively easily and can lead to difficulties, for example at the assembly stage, such as in the bonding and painting of bodywork parts. Accordingly, the use of silicone oils which have not been firmly bound is not welcomed by car manufacturers.

DE-A-3503479 proposes a coating composition containing a polyurethane prepolymer obtained by reacting a hydroxyl-terminated polyester polyol with an organic diisocyanate in a molar NCO:OH ratio of 0.6:1 to 0.95:1, a castor oil polyol and an isocyanate-terminated urethane prepolymer as a friction-reducing film. This coating composition is said also to contain a fluorocarbon resin, a liquid silicone oil and a small quantity of fillers and/or pigments. The coating composition is used in the form of a solution of the binder components in an organic solvent. There is no indication as to whether this binder system can be made up as a single-component system or multicomponent system for the user.

EP-A-655488 describes a urethane-resin-based coating composition for reducing friction which comprises a polyurethane paint containing a polyol and an isocyanate hardener and a polymeric powder of 11-nylon and/or 12-nylon with a melting point below the vulcanization temperature and a solubility parameter greater by at least 0.5 than the solubility parameter of the urethane paint. The polymeric powder is said to have a mean diameter of 5 to 500 $\mu$m. Again, there is no indication as to whether the coating compositions in question can be formulated as storage-stable one-component systems.

U.S. Pat. No. 5,558,741 describes a process for the production of a window sealing profile in which the elastomeric sealing profile is extruded and the surface of the elastomeric sealing profile is then exposed for 0.5 to 60 seconds to a UV radiation of about 0.2 to 40 joules. The surface thus treated is then coated with a friction-reducing coating consisting of a resin binder and a lubricating pigment. Fluorocarbon polymers, such as PTFE, and silicone lubricants are mentioned as preferred lubricants. The binder is not described in detail, but is merely said to be obtainable from Acheson Industries Inc. under the name of "EMRALON".

DE-A-19608057 describes a water-dilutable sealing strip coating comprising a two- or three-component system containing a silicone emulsion base, a composition based on a polyurethane dispersion which extends the life of the bath and a crosslinker composition based on a silicone-like or non-silicone-like organic epoxy resin which preferably also contains an organic solvent.

DE-A-19520278 describes one- or two-component urethane paints for coating elastomers containing polyurethane prepolymers with on average two or more isocyanate groups per molecule which are prepared by mixing alcohols having a functionality of two or higher with an excess of isocyanate compounds having a functionality of two or higher and solvent and which contain an extremely large quantity of a compound containing iron oxide for improving surface slip.

EP-A-0375923 describes moisture-curing one-component polyurethane paints for coating elastomers containing polyurethane prepolymers with on average two or more isocyanate groups per molecule which are prepared by mixing alcohols having a functionality of two or higher with an excess of isocyanate compounds having a functionality of two or higher and solvents, reactive polysiloxanes and reactive surfactants being used for improving surface slip. The surfactants are compounds containing a perfluorinated alkyl group with 6 to 12 carbon atoms and a non-fluorinated hydrophilic group with a group reactive to isocyanate-terminated paint ingredients. The paints in question may preferably contain other auxiliaries such as, for example, retarders, accelerators, stabilizers and pigments. However, they may only be applied as very thin films.

The problem addressed by the present invention was to provide one-component water-based coating compositions for coating elastomers which would enable the elastomer profile to be satisfactorily coated and, at the same time, would establish a very low coefficient of friction. In addition, the coatings would show improved abrasion resistance and media resistance in relation to the prior art.

The solution to this problem is defined in the claims and consists essentially in the provision of a suitable polyurethane paint composition containing an effective agent for improving surface slip behavior.

BRIEF SUMMARY OF THE INVENTION

Accordingly, the present invention relates to water-based one-component polyurethane paint compositions for coating elastomers which contain at least one aqueous polyurethane dispersion, a compound containing blocked isocyanate groups, an agent for improving surface slip (friction coefficient), at least one wetting and flow control agent and optionally typical coupling agents, dyes and/or pigments.

The present invention also relates to a process for improving the surface slip of elastomer surfaces, characterized by the following key steps:

- optionally cleaning the elastomer surface,
- optionally applying a layer of coupling agent to the elastomer surface,
- coating the elastomer surface with a composition containing at least one aqueous polyurethane dispersion, a compound containing blocked isocyanate groups, an agent for improving surface slip, at least one wetting and flow control agent and other auxiliaries and additives, coating being carried out by dipping the elastomer profiles in or spraying them with the composition,
- drying the elastomer profile for 0.5 to 15 minutes at temperatures of 50° C. to 200° C. and preferably at temperatures of 90° C. to 180° C., the binder system crosslinking by chemical reaction after evaporation of the volatile constituents.

The present invention also relates to the use of elastomer profiles thus coated for sealing window channels for moving glass parts and/or as sealing profiles in car assembly, for example as sealing profiles for doors, trunk lids, sliding roofs or engine hoods.

DETAILED DESCRIPTION OF THE INVENTION

In principle, any aliphatic dispersions based on polyesters or polycarbonates and aliphatic polyisocyanates may be used as the polyurethane dispersions. The polyurethane dispersions contain binders which, essentially, no longer contain any free isocyanate groups although they may contain self-crosslinking groups. It is particularly preferred to use combinations of polyurethane dispersions based on aliphatic polyisocyanates and polycarbonates and on aliphatic polyisocyanates and polyesters. These polyurethane binders are known and standard commercial products and are preferably used for water-based paints.

Any preferably aliphatic polyisocyanate derivatives known per se containing blocked isocyanate groups may be used as the compound containing blocked isocyanate groups.

Actual examples of these blocked polyisocyanate derivatives are reaction products of low molecular weight diols and/or triols such as, for example, ethylene glycol, propylene glycol, butanediol, trimethylol propane, glycerol and the like with a stoichiometric excess of diisocyanates, such as 4,4'-dicyclohexylmethane diisocyanate ($H_{12}MDI$), 1-isocyanatomethyl-3-isocyanato-1,5,5-trimethyl cyclohexane (isophorone diisocyanate, IPDI), cyclohexane-1,4-diisocyanate, hydrogenated xylylene diisocyanate ($H_6XDI$), 1-methyl-2,4-diisocyanatocyclohexane, m- or p-tetramethyl xylene diisocyanate (m-TMXDI, p-TMXDI), dimer fatty acid diisocyanate, tetramethoxybutane-1,4-diisocyanate, butane-1,4-diisocyanate, hexane-1,6-diisocyanate (HDI), 1,6-diisocyanato-2,2,4-trimethylhexane, 1,6-diisocyanato-2,4,4-trimethyl hexane, butane-1,4-diisocyanate and 1,12-dodecane diisocyanate ($C_{12}DI$) with subsequent blocking of the free isocyanate groups. Another possibility is to use biuretization or isocyanuratization products of the above-mentioned diisocyanates followed by blocking of the free isocyanate groups.

The blocking agents to be used are selected from aldoximes, ketoximes, lactams, imidazole compounds, β-dicarbonyl compounds such as, for example, malonic acid dialkyl esters or acetoacetic esters. Other blocking agents known per se include alcohols, phenols, more particularly alkylphenols, thioalcohols, thiophenols, secondary amines, amides, imides or hydroxamic acid esters. These blocking groups are then released during curing or crosslinking of the binder system, optionally using catalysts, so that the isocyanate groups released are able to react with other reactive groups such as, for example, hydroxyl groups, epoxy groups, amino groups or carboxyl groups from other constituents of the binder and thus contribute to an increase in molecular weight or to crosslinking of the binder system.

The agent for improving the surface slip behavior of the polyurethane paint composition according to the invention may be selected from powder-form fluoropolymers, more particularly polytetrafluoroethylene (PTFE), and copolymers of perfluoroethylene with other olefinically unsaturated comonomers which may, but need not, contain fluorine, powder-form dialkyl siloxane polymers and/or copolymers or mixtures thereof. Preferred powder-form polydialkyl siloxanes are polydimethyl siloxane powders. Emulsions of an aminofunctional polydimethyl siloxane, an epoxyfunctional polydimethyl siloxane or a hydroxyalkylfunctional polydimethylsiloxane may also be used, optionally in the form of a mixture of various emulsions and/or together with the above-mentioned powder-form fluoropolymers or siloxane polymers. Where emulsions of a polydimethylsiloxane are used, it is important that they contain at least one organofunctional group per molecule which is capable of chemically reacting with the reactive groups of the binder—more particularly with the blocked isocyanate groups—during the drying step or the curing process so that the polydimethyl siloxane chain is chemically fixed in the binder system and unable to migrate.

Wetting and flow control agents in the context of the invention are any important additives typically encountered in paint technology, including wetting agents and dispersants, optionally thickeners, defoamers, optionally biocides, film forming aids and lubricants. Suitable wetting agents and dispersants are the usual low molecular weight or even polymeric dispersants, for example anionic surfactants, nonionic surfactants or optionally even cationic surfactants. Polyether-modified low molecular weight polydimethyl siloxanes may also be used as wetting aids. Defoamers are known to collect at the surface of the liquid paint or paint film in the form of extremely thin layers and suppress the formation of foam bubbles or cause existing foam to collapse. Effective defoamers are products based on natural or synthetic mineral oils, higher alcohols, modified silicone oils or even polyesters. The flow control agents are intended to promote surface smoothness of the paint films and may be selected from high-boiling solvents used in small quantities and from silicone oils partly modified with polyesters and similar paint auxiliaries. The total quantity of wetting and flow control agents in the formulations according to the invention is up to about 5% by weight, based on the composition as a whole, the sum total of the various wetting and flow control agents preferably being about 3 to 4% by weight.

The polyurethane paint compositions according to the invention may additionally contain typical coupling agents, preferably based on organofunctional silanes, for example aminoalkyl alkoxysilanes, 3-glycidyloxypropyl trialkoxysilane or even vinyl trialkoxysilane. The alkoxy groups are generally $C_{1-4}$ alkoxy groups.

The polyurethane paint compositions according to the invention may also contain soluble dyes, pigments, flatting agents and other typical auxiliaries. Preferred flatting agents are those based on silica. A particularly preferred black pigment is carbon black.

Since the binder system of the polyurethane paint according to the invention is based on aqueous dispersions, the production process is very simple. The polyurethane dispersions, the blocked polyisocyanate compound, the wetting and flow control agents and the other auxiliaries and the water are mixed together by intensive stirring and the pigments and the agent(s) for improving surface slip behavior are subsequently stirred in. The carbon black pigment may be introduced as a predispersed paste or dispersion of carbon black. The agents for improving surface slip behavior should have a particle diameter of less than 10 µm and preferably of 2 to 5 µm so that there is no need for further grinding of the powder-form constituents with the binder system.

The present invention also relates to the use of the above-mentioned polyurethane paints for the coating of elastomers, more particularly nonpolar elastomers, such as styrene/butadiene rubber, or elastomers based on ethylene/propylene/diene polymers (EPDM) and other flexible substrates, more particularly polyurethanes. The elastomers thus coated show low friction towards glass, particularly in sheet form. This facilitates the movement of displaceable glass panels in vehicles and, compared with uncoated elastomers, also reduces the squeaking noises during driving which can occur with uncoated frames through small sliding movements between the (uncoated) elastomer and other parts of the vehicle, such as the screens or the painted surface of the frame.

In a preferred process for the production of these coated elastomers, the polyurethane paint composition is applied to the still hot vulcanized elastomer profile immediately after leaving the oven either by spraying or by brushing on, the dispersant evaporating almost completely so that there is no need in this case for a separate drying step. The subsequent crosslinking of the polyurethane paint on the elastomer can be carried out by heating for 0.5 to 15 minutes to temperatures of 50° C. to 200° C. and preferably to temperatures of 90° C. to 180° C. The dry film thickness of the polyurethane paint is about 10 to 15 µm.

The following Examples are intended to illustrate the invention without limiting its scope in any way. All quantities in the following Examples are percentages by weight or parts by weight, based on the composition as a whole, unless otherwise stated.

EXAMPLES

A polyurethane paint composition was prepared from the following constituents:

| Raw material | [%] |
| --- | --- |
| PU dispersion, aliphatic (polycarbonate) (40%) | 17.00 |
| PU dispersion, aliphatic (polyester) (36%) | 28.00 |
| Wetting aid - sulfosuccinic acid ester sodium salt | 0.50 |
| Silica flatting agent TS 100 | 1.50 |
| Polyester-based defoamer | 0.10 |
| Teflon - polytetrafluoroethylene, mean particle size 2–5 µm | 3.00 |
| Bubble-collapsing agent - mixture of surface-active polymers | 0.50 |
| Wetting aid - polyether-modified polydimethyl siloxane | 1.0 |
| Wetting aid - polyether-modified polydimethyl siloxane | 1.0 |
| Aminofunctional polydimethyl siloxane o/w emulsion | 2.00 |
| 1,3,5-tris[6-[[[[(1-methylpropylidene)amino]oxy)carbonyl]-amino]hexyl-1,3,5-triazin-2,4,6-[1H,3H,5H]-trione isocyanate blocked with methylethyl ketoxime, dispersion | 5.00 |
| Carbon black paste (25% carbon black) in water | 2.00 |
| Water, deionized | 38.40 |
| Total | 100.00 |

Production of the polyurethane paint composition was carried out by a two-stage process preceded by preparation of a carbon black paste and a stirring mixture.

A carbon black paste was prepared from the following constituents:

| | |
| --- | --- |
| fatty alcohol ethoxylates | 15.00 |
| defoamer based on white mineral oil, wetting agent and silicones | 1.00 |
| carbon black | 25.00 |
| water, deionized | 59.00 |

The constituents of the carbon black paste were weighed into a container and homogeneously mixed. The resulting mixture was then ground in a bead mill to a fineness of less than 50 µm.

Production of the Paint

The PU dispersions were introduced first and the paint additives and wetting aids were then added together with some of the water. The carbon black paste was then added and, after stirring for another 15 minutes, the product was filtered through a 50 µm filter. The PTFE powder, the silicone resin and the silicone additives were then added.

The following test results were obtained with the polyurethane paint thus produced.

Test Results:

| | | |
| --- | --- | --- |
| 1. | Viscosity | 25 mPa.s |
| 2. | Density 20° C. | 0.98 g/ml |
| 3. | Solids content, 30 mins./130° C. (DIN 53216) | 28.2% |
| 4. | Friction coefficient | 0.25 |
| 5. | Gloss | 4.1 |
| 6. | Elongation | 236% |

Description of Tests
1. Viscosity

Viscosity was determined using a Brookfield LVT viscosimeter, spindle 2, 30 r.p.m., 25° C. (to DIN 53019, Part 1, May 1980 Edition)

2. Density

Density was determined to DIN 51757 (June 1992 Edition) with a spindle (areometer) at 20° C. in a 250 ml gas jar.

3. Solids content

The dry residue was determined to DIN 53216 (30 mins./30° C.)

4. Friction coefficient

The test was used to evaluate the friction behavior of a painted rubber surface towards another friction partner (for example glass) under predetermined conditions. To this end, a rubber plate was coated with the paint (for example by spraying) and the paint film was then dried (for example for 1 minute at 180° C.). 20 cm$^2$ disks were punched out from the painted surface. A defined plate of glass (preferably single-ply safety glass) was attached with double-sided adhesive tape to the carriage of the surface slip tester (for example Erichsen Model 603) and cleaned with isopropanol. The test specimen was placed with its painted side on the glass plate and weighted with a 200 g weight (press-on weight).

The dial gauge and weight are joined by a strap. The pointer of the dial gauge is set to "0", the speed selector lever is set to 150 mm/min. and the measurement thus started. The test specimen is pulled away at a speed of 150 mm/min. and the frictional force generated is recorded by the dial gauge and a pointer.

The friction coefficient is calculated from the quotient of the sliding friction force and the applied force: $\mu$=FR/N.

5. Gloss

The reflective gloss is measured by comparison with a normal gloss.

The paint is thoroughly homogenized. A degreased steel plate (150×70 mm) is placed on a flat substrate. A small quantity of paint mixture is applied to the plate and then drawn over the plate with a coating knife in a wet film thickness of 150 μm. The paint is then dried for 2 mins. at 180° C. and cooled for 5 mins. The measuring head of the calibrated measuring instrument (for example PICO GLOSSMASTER 50°, Model 500, manufacturer: Erichsen, Hemer) is applied to the specimen, the red button is depressed and held down until the reading is constant. The results shown are "gloss measurement" values—the standardized reflector values according to DIN 67530, ISO 2813 and ASTM 523.

6. Elongation

The dried paint applied to a rubber strip is stretched by a tensile tester until the first cracks appear in the layer of paint. The interval between two fixed marks and the change produced by stretching is measured and, after conversion, gives the breaking elongation in %.

The performance properties of the polyurethane paint according to the invention are compared with those of known low-friction paints in Table 2 below. It is clear from the test results that the polyurethane paint according to the invention is characterized by very good results in all important performance properties whereas the known low-friction paints are characterized by poor or very poor results.

|  | Invention | Comparison 1 | Comparison 2 | Comparison 3 | Comparison 4 |
|---|---|---|---|---|---|
| Abrasion resistance | + | + | − | − | ○ |
| Friction coefficient | + | ○ | + | + | + |
| UV stability | + | − | + | + | + |
| Flexibility (RT) | + | − | + | + | + |
| Flexibility (−40° C.) | + | − | + | + | − |
| Ageing resistance | + | − | − | + | + |
| Processing | + | ○ | ○ | − | ○ |
| VOC | + | − | ○ | − | − |

Comparison 1 is a two-component solvent-containing paint with PTFE
Comparison 2 is a two-component water-based paint with PTFE
Comparison 3 is a four-component solvent-containing paint with silicone
Comparison 4 is a two-component PU paint ("Cuvertin 326 A/B", Henkel)
The symbols used for the performance properties have the following meanings:
+ = very good
○ = acceptable
− = unacceptable
VOC = volatile organic compounds

What is claimed is:

1. A water-based polyurethane coating composition for coating elastomers comprising
   a) an aqueous polyurethane dispersion,
   b) a compound containing blocked isocyanate groups,
   c) an agent for improving surface slip behavior, and
   d) at least one wetting agent or flow control agent.

2. A water-based polyurethane, coating composition according to claim 1 wherein the aqueous polyurethane dispersion comprises a reaction product of one or more aliphatic polyisocyanates and one or more polycarbonates or a reaction product of one or more aliphatic polyisocyanates and one or more polyesters.

3. A water-based polyurethane coating composition according to claim 1 wherein the aqueous polyurethane dispersion comprises a combination of a reaction product of one or more aliphatic polyisocyanates and one or more polycarbonates and a reaction product of one or more aliphatic polyisocyanates and one or more polyesters.

4. A water-based polyurethane coating composition according to claim 1 wherein the aqueous polyurethane dispersion contains essentially no free isocyanate groups.

5. A water-based polyurethane coating composition according to claim 1 wherein the compound containing blocked isocyanate groups is selected from blocked biuretization or isocyanuratization products of one or more cycloaliphatic or aliphatic diisocyanates selected from the group consisting of 4,4'-dicyclohexylmethane diisocyanate ($H_{12}$MDI), 1-isocyanatomethyl-3-isocyanato-1,5,5trimethyl cyclohexane (isophorone diisocyanate, IPDI), cyclohexane-1,4-disocyanate, hydrogenated xylylene diisocyanate ($H_6$XDI), m- and p-tetramethyl xylene diisocyanate (m-TMXDI, p-TMXDI), dimer fatty acid diisocyanate, hexane-1,6-diisocyanate (HDI), 1,6-di-isocyanato-2,2,4-trimethyl hexane, 1,6-diisocyanato-2,4,4-trimethyl hexane, butane-1,4-diisocyanate, 1,12-dodecane diisocyanate ($C_{12}$DI), and mixtures thereof.

6. A water-based polyurethane coating composition according to claim 5 wherein the blocked biuretization or isocyanuratization product is selected from the group consisting of aldoximes, ketoximes, lactams, imidazoles, β-dicarbonyl compounds, phenols, hydroxamic acid esters and mixtures thereof.

7. A water-based polyurethane coating composition according to claim 1 wherein the compound containing blocked isocyanate groups is a reaction product of a low molecular weight polyol having one to five carbon atoms or mixtures thereof with a stoichiometric excess of one or more diisocyanates selected from the group consisting of 4,4'-dicyclohexylmethane diisocyanate ($H_{12}$MDI), 1-isocyanatomethyl-3-isocyanato-1,5,5-trimethyl cyclohexane (isophorone diisocyanate, IPDI), cyclohexane-1,4-diisocyanate, hydrogenated xylylene diisocyanate ($H_6$XDI), m- and p-tetramethyl xylene diisocyanate (m-TMXDI, p-TMXDI), dimer fatty acid diisocyanate, hexane-1,6-diisocyanate (HDI), 1,6-diisocyanato-2,2,4-trimethylhexane, 1,6-diisocyanato-2,4,4-trimethyl hexane, butane-1,4-diisocyanate, 1,12-dodecane diisocyanate ($C_{12}$DI) and mixtures thereof, with subsequent blocking of free isocyanate groups.

8. A water-based polyurethane coating composition according to claim 7 wherein the low molecular weight polyol having one to five carbon atoms is selected from the group consisting of ethylene glycol, propylene glycol, butanediol, trimethylol propane, glycerol, and mixtures thereof.

9. A water-based polyurethane coating composition according to claim 1 wherein the agent for improving surface slip behavior is selected from the group consisting of powder-form fluoropolymers, polytetrafluoroethylene (PTFE), copolymers of perfluoroethylene with other olefinically unsaturated comonomers which contain fluorine, copolymers of perfluoroethylene with other olefinically unsaturated comonomers which contain no fluorine, powder-form dialkyl siloxane polymers and/or copolymers and mixtures thereof.

10. A water-based polyurethane coating composition according to claim 1 wherein the agent for improving surface slip behavior is a polytetrafluoroethylene powder, a polydialkyl siloxane powder, an emulsion of an aminofunctional polydimethyl siloxane or a mixture thereof.

11. A water-based polyurethane coating composition according to claim 1 comprising both at least one wetting agent and at least one flow control agent.

12. A water-based polyurethane coating composition according to claim 1 wherein the wetting agent is selected from the group consisting of organic solvents, anionic, nonionic and cationic surfactants, siloxane copolymers, and mixtures thereof.

13. A water-based polyurethane coating composition according to claim 1 wherein the flow control agent is selected from the group consisting of high boiling solvents, silicone oils modified with polyesters, and mixtures thereof.

14. A water-based polyurethane coating composition according to claim 1 further comprising at least one coupling agent.

15. A water-based polyurethane, coating composition according to claim 14 wherein the coupling agent is selected from the group consisting of aminoalkylsilanes, 3-glycidyloxypropyl trialkoxysilanes, trialkoxysilanes, and mixtures thereof.

16. A water-based polyurethane coating composition according to claim 1 further comprising at least one defoamer.

17. A water-based polyurethane paint composition according to claim 1 further comprising at least one composition selected from the group consisting of dyes, pigments, and mixtures thereof.

18. A process for improving the surface slip behavior of an elastomer surface, said process comprising a) coating the elastomer surface with a water-based polyurethane coating composition according to claim 1, and b) drying the coated elastomer surface for 0.5 to 15 minutes at temperatures of 50° C. to 200° C.

19. A process according to claim 18 wherein the drying temperature is from 90° C. to 180° C.

20. A process according to claim 18 wherein the elastomer surface is coated while still hot from vulcanization.

21. A process according to claim 18 wherein the elastomer surface is cleaned prior to being coated.

22. A process according to claim 18 wherein a layer of coupling agent is applied to the elastomer surface prior to being coated.

23. The process of claim 18 wherein the elastomer surface to be coated is an elastomer profile for sealing window channels for moving glass parts.

24. The process of claim 18 wherein the elastomer surface to be coated is an elastomer profile for use in car manufacture.

* * * * *